Figure 1:
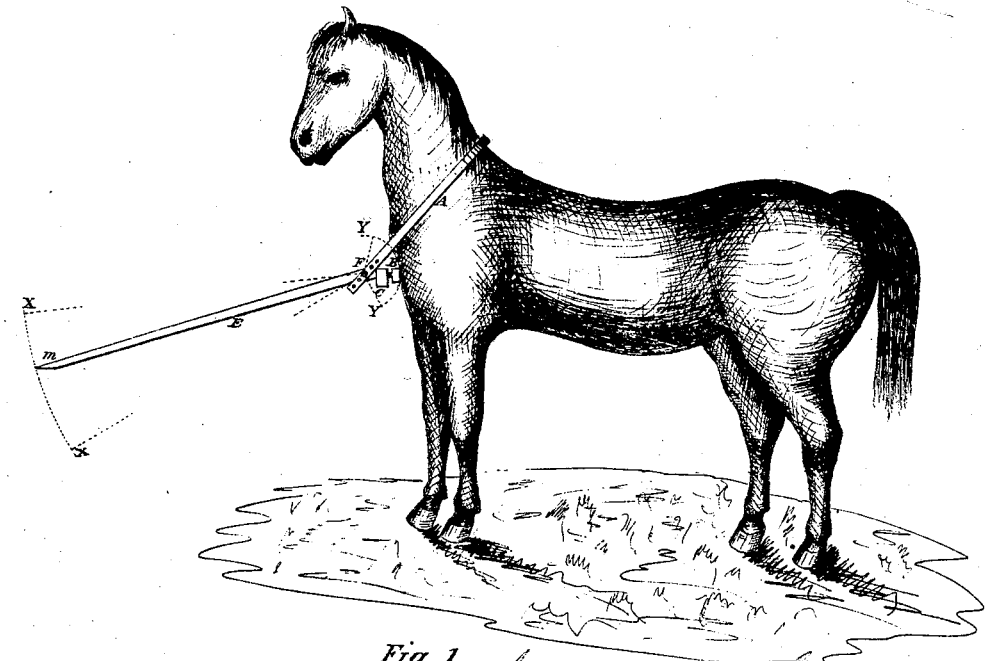

J. GREEN.
Improvement in Animal Pokes.

No. 123,692. Patented Feb. 13, 1872.

*This is a horse*

Geo. W. Raff.
Andrew Choffin.
} Witnesses.

Josiah Green, Inventor
by Job Abbott — Attorney.

AM. PHOTO-LITHOGRAPHIC CO. N.Y. (OSBORNE'S PROCESS.)

UNITED STATES PATENT OFFICE.

JOSIAH GREEN, OF HELMICK, OHIO.

IMPROVEMENT IN ANIMAL-POKES.

Specification forming part of Letters Patent No. 123,692, dated February 13, 1872.

SPECIFICATION.

*To all whom it may concern:*

Be it known that JOSIAH GREEN, of Helmick, in the county of Coshocton and State of Ohio, has invented certain new and useful Improvements in Horse and Cattle Pokes; and that the following is a full, clear, and exact specification thereof, which will enable others skilled in the art to make and use the said invention.

In cattle pokes heretofore constructed in which sharp points are used to prevent any violent attempts of the animal to break down or jump over the inclosure there are several features of objection, which I will state in order to show more clearly the nature and objects of my invention.

In those pokes in which the neck-bow is rigidly attached to a head-piece having the points and shield at its rear end, and having the poke-bar pivoted at its front end, the tossing of the animal's head, while feeding in the field, to drive off the flies, raises the poke-bar by a movement around its pivot-joint, and it then drops violently down to its bearing in the head-piece, and in so doing acts with sufficient power to force the head-piece against the shield-springs, thus uncovering the points and forcing them into the animal's breast. In those pokes in which the neck-bow is jointed to the poke-bar, and the shield for the points is held out by springs acting between said shield and the bow the animal will often lift the poke-bar over the fence and then proceed to jump over or tear it down, which he can then do with impunity, as the bearing of the poke-bar upward by the fence tends to keep the shield out from the points instead of acting to compress the springs and uncover the points, and the tossing of the animal's head while feeding raises the poke-bar and then causes it to fall with considerable momentum, which compresses the springs between the shield and bow, and thus uncovers the points so as to scratch and wound the animal's breast. In those pokes in which both the neck-bow and poke-bar are rigidly attached to a head-piece having barbs therein covered by a shield held out by springs placed between it and said head piece, the tossing up and down of the animal's head causes the whole poke to swing on the animal's neck around the upper part of the neck-bow as an axis, and the whole poke falls, when thrown up, with such force as to push back the shield when it strikes the animal's neck, thus uncovering the barbs and driving them into the neck, when there is no cause therefor. These objections, in connection with other objections in construction not necessary to recite here, which make the poke liable to get out of order and easily broken by the animal when in practical use, it is the object of my invention to overcome, and to this end—

My invention consists in the combination of a rigid poke-bar having a short cross-piece provided with sharp points, and a shield-piece arranged on slide-pins and held out by springs at its rear end, with a neck-bow attached to the poke-bar by a pivot-joint, and having a bearing on the cross-piece at its rear end, the several parts being so arranged as to force the points squarely into the animal's breast in case he comes up to the fence and attempts to jump over or tear it down, and the action of the springs being entirely independent of the movement of the bow on the poke-bar, so that the tossing up and down of the poke-bar by the animal while feeding shall simply cause the shield to slide on the animal's breast without uncovering the points and wounding him.

Figure 2:
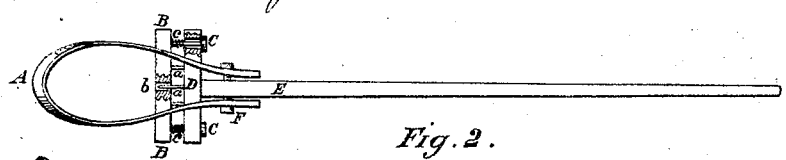
Figure 3:
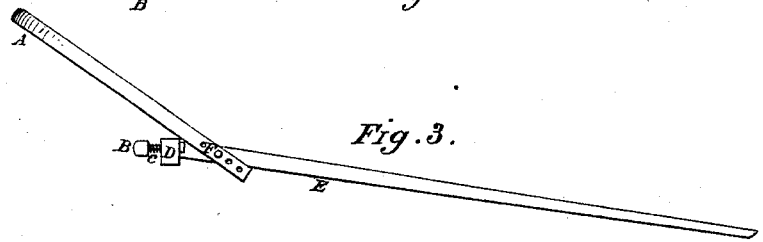

In the accompanying drawing, Figure 1 is a view showing a practical application of my improved poke. Figs. 2 and 3 are plan and side views of my improved poke.

In my improved poke, shown in Figs. 2 and 3, E is a rigid wooden bar of suitable size and length, on the rear end of which is mortised the short stout wooden cross-piece D, in which are secured the sharp points *a a a*, which are conveniently made of short pieces of stout wire driven into the cross-piece D, and sharpened at their ends. The shield B is a wooden frame, slightly rounded off on its rear face, and is secured to the cross-piece D by the headed slide-pins C C, which are inserted through holes in said cross-piece and screw into the shield B. The holes *b b* are made in the shield B so that when said shield is forced back the points *a a* project through said holes into the animal's breast, and the spiral springs *c c* are placed around the pins C C between the cross-piece D and shield B, thus serving to keep the shield pressed out so as to keep the points covered. The neck-bow A is pivoted to the poke-bar E, by the pivot-bolt F, which extends through holes in the ends of the bow and a hole in the poke-bar. There are several holes made in the ends of the neck-bow, as shown, in order to adjust it to the necks of different animals, and the rear edge of the bow rests on the cross-bar D, so that when the poke is placed on the animal's neck, as shown in Fig. 1, the shield B rests against the breast, and the bearing of the piece D under the bow A supports the poke-bar E in the position shown.

From this description it will be seen that whenever the animal approaches a fence so as press the poke-bar E either backward or downward such pressure will compress the springs $c$ $c$ and thus let the shield B back so as to uncover the points and prevent the further attempts of the animal. But where there is no backward pressure on the poke-bar, as in case the animal is tossing the poke-bar up and down in shaking his head while feeding, the poke-bar simply swings on the pivot-bolt F as an axis, the end $m$ describing the arc $x$ $x$, and the shield B moving in the arc $y$ $y$; or, in other words, moving up and down on the animal's breast without approaching the cross-piece D by compressing the springs $c$ $c$, and, therefore, without uncovering the points so as to allow them to wound the animal's breast.

I do not claim the sharp points in connection with a cattle-poke; nor a rigid poke-bar pivoted in a neck-bow, except when the points at its rear end are protected by a shield held out by springs acting entirely independent of the neck-bow; nor the combination of cross-piece, points, shield, slide-pins, and springs with the rigid poke-bar, except when said bar is pivoted in the neck-bow; nor do I lay any claim whatever to any poke constructed with a poke-bar jointed in a head-piece which is rigidly attached to the neck-bow.

Claim.

What I claim as new, and desire to secure by Letters Patent, is—

The herein-described animal-poke, consisting of the neck-bow A, rigid poke-bar E, cross-piece D with barbs $a$ $a$, and shield B with slide-pins C C and springs $c$ $c$, said poke-bar being pivoted in the neck-bow and supported by the bearing of the cross-piece against said bow, and the several parts being arranged and operating as herein specified.

JOSIAH GREEN.

Witnesses:
  JOB ABBOTT,
  ANDREW CHOFFIN.